W. B. SLOAN.
ANIMAL POKE.
APPLICATION FILED JUNE 26, 1912.
1,091,972.
Patented Mar. 31, 1914.
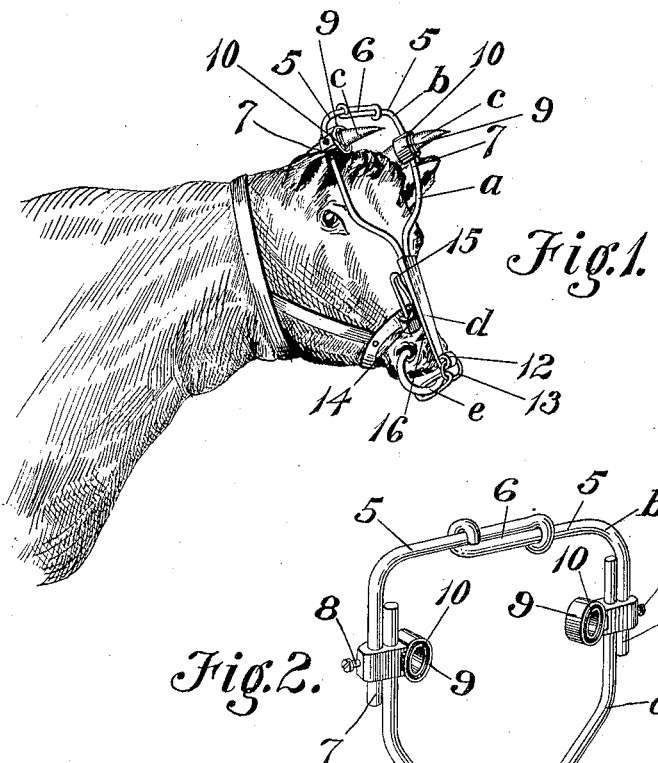
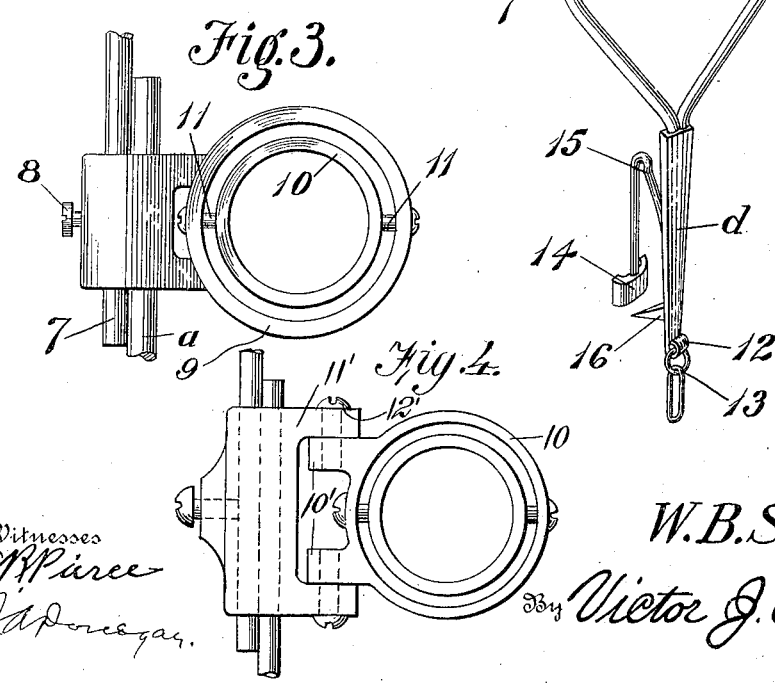
Witnesses
Inventor
W. B. Sloan
By Victor J. Evans
Attorney
COLUMBIA PLANOGRAPH CO., WASHINGTON, D. C.

UNITED STATES PATENT OFFICE.

WILLIAM B. SLOAN, OF CLEVELAND, TENNESSEE.

ANIMAL-POKE.

1,091,972.  Specification of Letters Patent.  Patented Mar. 31, 1914.

Application filed June 26, 1912. Serial No. 706,032.

*To all whom it may concern:*

Be it known that I, WILLIAM B. SLOAN, a citizen of the United States, residing at Cleveland, in the county of Bradley and State of Tennessee, have invented new and useful Improvements in Animal-Pokes, of which the following is a specification.

The general object of the invention is to refine the construction and operation of animal pokes by rendering the poke extremely light and of such shape as to cause no annoyance or inconvenience to the animal unless he attempts to use his horns or to brush aside such objects as fence wires or rails with his nose; and to this end the invention consists in certain improved constructions, arrangements, and combinations of devices, which will be fully described hereinafter, and then pointed out in the claims.

Other objects will appear and be better understood from that embodiment of my invention of which the following is a specification, reference being had to the accompanying drawings forming part hereof, in which:

Figure 1 is a perspective of the device in use. Fig. 2 is an enlarged detail perspective of the nose piece. Fig. 3 is a detail showing one of the horn clamps in plan and fragments of the frame. Fig. 4 is a view similar to Fig. 3 showing a slight modification.

The improved animal poke includes a metallic frame comprising a lower section $a$ and an upper section $b$. The section $a$ is formed of relatively stout steel wire, and when in use is arranged over the animal's head with the section $b$ projecting considerably above the horns $c$. From the horns the frame extends downwardly for a suitable distance and preferably to the central portion of the animal's nose and is suitably connected to a nose piece $d$, which is suitably connected to a nose ring $e$ in the nose of the animal. The upper section $b$ is formed of the sections 5, 5 which are suitably adapted such as shown at 6, to slide one upon the other and this for the purpose of rendering the frame adjustable as to width so that it may be used in connection with various size heads and also in the event of the frame being applied to an animal which has yet to attain its full growth, to admit of the frame adjusting itself to the head as the same grows in width. The sides of the frame are formed of sections 7, 7 which are adjustably secured by suitable means such as set screws 8, 8, in rings 9, 9 which surround the horns $c$. With this construction the frame may be adjusted in length to suit the length of the animal's head and to correspond to the lateral adjustment made possible by the construction of the end $b$. Arranged in each of the rings 9, 9 is an inner ring 10. This construction is clearly illustrated in Fig. 3. The inner rings 10 are passed over the horns $c$ and are shaped so as to enable them to frictionally bind on the said horns when forced downwardly with a suitable implement. The said rings are preferably of metal and each ring has outwardly extending trunnions 11, 11 as shown in Fig. 3, which enter suitable openings in the surrounding outer ring 9 and form pivotal supports for the same. This construction admits of appreciably increasing the inner diameters of the outer rings so as to admit of considerable rocking movement of the said rings when the upper end $b$ of the frame is brought into contact with an object.

In Fig. 4 of the drawing there is shown a slight modification wherein the ring 10 is provided with a pair of spaced pivot ears 10' which are adapted to be mounted between the extensions 11', said extensions and ears being provided with openings for the reception of pivot bolts 12' whereby the ring 10 will have a swinging movement with respect to the sections 7, 7. The lower end of the nose piece $d$ is preferably formed with an eye 12 and a flexible connector of suitable construction, such as a chain 13, is employed for connecting the eye 12 with the nose ring $e$. This connector is of such length as to let the nose ring assume its normal position until the end $b$ is brought into contact with an object, whereupon the frame will be rocked and pull upwardly on the nose ring which will now endeavor as the pressure on the end $b$ continues, to stretch the nose and thereby hurt the animal.

The nose guard 14 is of metal although it may be formed of other suitable material, and is shaped to conform to the bridge of the nose. This element is arranged in spaced relation to the inner face of the nose piece $d$ and is yieldingly held in such position by a spring 15 which is adapted to yield when the nose piece $d$ is brought into contact with an object. This yielding of the spring 15 brings the nose piece nearer to or in contact with the nose guard 14, in fact the nose guard and nose piece move relatively to each other, which has the effect of projecting the pricking point 16 into contact with the animal's nose. This, of course, will hurt the animal and continue to do so until he moves the nose piece from contact with the object.

What is claimed as new is:

1. An animal poke comprising a frame including an upper section and a lower section, the upper section comprising lateral expansible members, connectors adjustably receiving the meeting ends of the sections, rings formed at the inner ends of the said connectors, horn receiving rings rotatably mounted within the first mentioned rings, a nose piece carried by the lower section of the frame, and a nose guard flexibly connected with the nose piece.

2. An animal poke comprising a frame including an upper section and a lower section, the upper section comprising lateral expansible members, connectors adjustably receiving the meeting ends of the sections, rings formed at the inner ends of the said connectors, horn receiving rings rotatably mounted within the first mentioned rings, a nose piece carried by the lower section of the frame, a nose guard flexibly connected with the nose piece, and a pricking point carried by the nose piece, said guard serving to normally maintain the pricking point out of contact with the animal's nose.

In testimony whereof I affix my signature in presence of two witnesses.

WILLIAM B. SLOAN.

Witnesses:
E. T. KNOX,
FRED H. WATERHOUSE.

Copies of this patent may be obtained for five cents each, by addressing the "Commissioner of Patents, Washington, D. C."